US011385894B2

(12) United States Patent
Lu et al.

(10) Patent No.: US 11,385,894 B2
(45) Date of Patent: Jul. 12, 2022

(54) PROCESSOR CIRCUIT AND DATA PROCESSING METHOD

(71) Applicant: REALTEK SEMICONDUCTOR CORPORATION, Hsinchu (TW)

(72) Inventors: Yen-Ju Lu, Hsinchu (TW); Chao-Wei Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 156 days.

(21) Appl. No.: 16/868,361

(22) Filed: May 6, 2020

(65) Prior Publication Data

US 2021/0216322 A1 Jul. 15, 2021

(30) Foreign Application Priority Data

Jan. 14, 2020 (TW) .................................. 109101262

(51) Int. Cl.
*G06F 9/30* (2018.01)
*G06F 9/54* (2006.01)
*G06F 9/38* (2018.01)

(52) U.S. Cl.
CPC ...... *G06F 9/30079* (2013.01); *G06F 9/30043* (2013.01); *G06F 9/30145* (2013.01); *G06F 9/3836* (2013.01); *G06F 9/544* (2013.01)

(58) Field of Classification Search
None
See application file for complete search history.

(56) References Cited

U.S. PATENT DOCUMENTS

| 2009/0106533 | A1* | 4/2009 | Arakawa | ............... G06F 9/3834 |
| | | | | 712/205 |
| 2009/0240919 | A1 | 9/2009 | Alexander et al. | |
| 2014/0181462 | A1* | 6/2014 | Rozas | ................ G06F 12/1027 |
| | | | | 711/207 |
| 2017/0371659 | A1* | 12/2017 | Smith | ................... G06F 9/3836 |

FOREIGN PATENT DOCUMENTS

TW          I435267 B          4/2014

OTHER PUBLICATIONS

English Abstract of TWI435267B.

* cited by examiner

*Primary Examiner* — Scott C Sun
(74) *Attorney, Agent, or Firm* — WPAT, P.C., Intellectual Property Attorneys; Anthony King (57) ABSTRACT

A processor circuit is provided. The processor circuit includes an instruction decode unit, an instruction detector, an address generator and a data buffer. The instruction decode unit is configured to decode a load instruction to generate a decoding result. The instruction detector, coupled to the instruction decode unit, is configured to detect if the load instruction is in a load-use scenario. The address generator, coupled to the instruction decode unit, is configured to generate a first address requested by the load instruction according to the decoding result. The data buffer is coupled to the instruction detector and the address generator. When the instruction detector detects that the load instruction is in the load-use scenario, the data buffer is configured to store the first address generated from the address generator, and store data requested by the load instruction according to the first address.

20 Claims, 8 Drawing Sheets

| | V | L | TG | DA |
|---|---|---|---|---|
| E(0)/idx(0) | 1 | 0 | 0x2000 | 0xaa |
| E(1)/idx(1) | 0 | 0 | - | - |
| E(2)/idx(2) | 0 | 0 | - | - |
| E(3)/idx(3) | 0 | 0 | - | - |

| ID | EX | MEM |
|---|---|---|
| mul1 | | |

410

CC1

| | V | L | TG | DA |
|---|---|---|---|---|
| E(0)/idx(0) | 1 | 0 | 0x2000 | 0xaa |
| E(1)/idx(1) | 1 | 1 | 0x3000 | - |
| E(2)/idx(2) | 0 | 0 | - | - |
| E(3)/idx(3) | 0 | 0 | - | - |

| ID | EX | MEM |
|---|---|---|
| load2 | mul1 | load1 |

CC2

| | V | L | TG | DA |
|---|---|---|---|---|
| E(0)/idx(0) | 1 | 0 | 0x2000 | 0xaa |
| E(1)/idx(1) | 1 | 0 | 0x3000 | 0xbb |
| E(2)/idx(2) | 0 | 0 | - | - |
| E(3)/idx(3) | 0 | 0 | - | - |

| ID | EX | MEM |
|---|---|---|
| add2 | load2 | mul1 |

CC3

| | V | L | TG | DA |
|---|---|---|---|---|
| E(0)/idx(0) | 1 | 0 | 0x2000 | 0xaa |
| E(1)/idx(1) | 1 | 0 | 0x3000 | 0xbb |
| E(2)/idx(2) | 0 | 0 | - | - |
| E(3)/idx(3) | 0 | 0 | - | - |

| ID | EX | MEM |
|---|---|---|
| load3 | add2 | load2 |

CC4

| | V | L | TG | DA |
|---|---|---|---|---|
| E(0)/idx(0) | 1 | 0 | 0x2000 | 0xaa |
| E(1)/idx(1) | 1 | 0 | 0x3000 | 0xbb |
| E(2)/idx(2) | 0 | 0 | - | - |
| E(3)/idx(3) | 0 | 0 | - | - |

| ID | EX | MEM |
|---|---|---|
| load4 | load3 | add2 |

CC5

| | V | L | TG | DA |
|---|---|---|---|---|
| E(0)/idx(0) | 1 | 0 | 0x2000 | 0xaa |
| E(1)/idx(1) | 1 | 0 | 0x3000 | 0xbb |
| E(2)/idx(2) | 1 | 1 | 0x4000 | - |
| E(3)/idx(3) | 0 | 0 | - | - |

| ID | EX | MEM |
|---|---|---|
| sl1 | load4 | load3 |

CC6

| | V | L | TG | DA |
|---|---|---|---|---|
| E(0)/idx(0) | 1 | 0 | 0x2000 | 0xaa |
| E(1)/idx(1) | 1 | 0 | 0x3000 | 0xbb |
| E(2)/idx(2) | 1 | 0 | 0x4000 | 0xcc |
| E(3)/idx(3) | 0 | 0 | - | - |

| ID | EX | MEM |
|---|---|---|
| store1 | sl1 | load4 |

CC7

| | V | L | TG | DA |
|---|---|---|---|---|
| E(0)/idx(0) | 1 | 0 | 0x2000 | 0xaa |
| E(1)/idx(1) | 1 | 0 | 0x3000 | 0xbb |
| E(2)/idx(2) | 1 | 0 | 0x4000 | 0xcc |
| E(3)/idx(3) | 0 | 0 | - | - |

| ID | EX | MEM |
|---|---|---|
| add4 | store1 | sl1 |

CC8

| | V | L | TG | DA |
|---|---|---|---|---|
| E(0)/idx(0) | 1 | 0 | 0x2000 | 0xaa |
| E(1)/idx(1) | 1 | 0 | 0x3000 | 0xbb |
| E(2)/idx(2) | 1 | 0 | 0x4000 | 0xcc |
| E(3)/idx(3) | 0 | 0 | - | - |

| ID | EX | MEM |
|---|---|---|
| - | add4 | store1 |

PROCESSOR CIRCUIT AND DATA PROCESSING METHOD

BACKGROUND

The present disclosure relates to data processing and, more particularly, to a processor circuit capable of reducing a load-use stall associated with a load instruction, and a data processing method.

In order to reduce the time for accessing data or instructions in a lower speed memory, central processing units nowadays utilize a cache mechanism. With proper design, the cache mechanism can usually obtain required data or instructions within a few clock cycles, which greatly enhances the system performance. However, in a case where a central processing unit processes a load instruction and an add instruction in sequence, when data required by the add instruction is data to be read by the load instruction, the central processing unit still needs to wait several clock cycles to execute the add instruction because it takes a period of time to access the data to be read from a local memory or a cache memory, such as a static random access memory (SRAM). In other words, the existing central processing unit utilizing the cache mechanism still suffers a load-use stall.

SUMMARY

The described embodiments therefore provide circuits and methods capable of reducing pipeline stalls associated with a load instruction whether the load instruction leads to a cache hit or a cache miss.

Some embodiments described herein include an exemplary processor circuit. The processor circuit includes an instruction decode unit, an instruction detector, an address generator and a data buffer. The instruction decode unit is configured to decode a load instruction to generate a decoding result. The instruction detector, coupled to the instruction decode unit, is configured to detect if the load instruction is in a load-use scenario. The address generator, coupled to the instruction decode unit, is configured to generate a first address requested by the load instruction according to the decoding result. The data buffer, coupled to the instruction detector and the address generator, is configured to, when the instruction detector detects that the load instruction in the load-use scenario, store the first address generated from the address generator, and store data requested by the load instruction according to the first address.

Some embodiments described herein include an exemplary a data processing method. The data processing method includes the following steps: receiving a load instruction and detecting if the load instruction is in a load-use scenario; decoding the load instruction to generate a decoding result; generating a first address requested by the load instruction according to the decoding result; when it is detected that the load instruction is in the load-use scenario, storing the first address into a data buffer; and storing data requested by the load instruction into the data buffer according to the first address.

BRIEF DESCRIPTION OF THE DRAWINGS

Aspects of the present disclosure are best understood from the following detailed description when read with the accompanying figures. It should be noted that, in accordance with the standard practice in the field, various features are not drawn to scale. In fact, the dimensions of the various features may be arbitrarily increased or reduced for clarity of discussion.

DETAILED DESCRIPTION

The following disclosure provides various embodiments or examples for implementing different features of the present disclosure. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In addition, reference numerals and/or letters may be repeated in various examples of the present disclosure. This repetition is for the purpose of simplicity and clarity and does not in itself dictate a relationship between the various embodiments and/or configurations discussed. Furthermore, as could be appreciated, the present embodiments provide many ideas that can be widely applied in various scenarios. The following embodiments are provided for illustration purposes, and shall not be used to limit the scope of the present disclosure.

By preparing in advance the data needed by a pending instruction, i.e. an instruction to be processed, the proposed data processing scheme can reduce/avoid a load-use stall caused by execution of the pending instruction. For example, in a case where a load instruction and an add instruction are processed in sequence, the proposed data processing scheme can prepare in advance the data needed by the add instruction, including the data requested by the load instruction, thereby successfully executing the add instruction without waiting for a return of an execution result of the load instruction. Detailed description is provided below.

Figure 1:
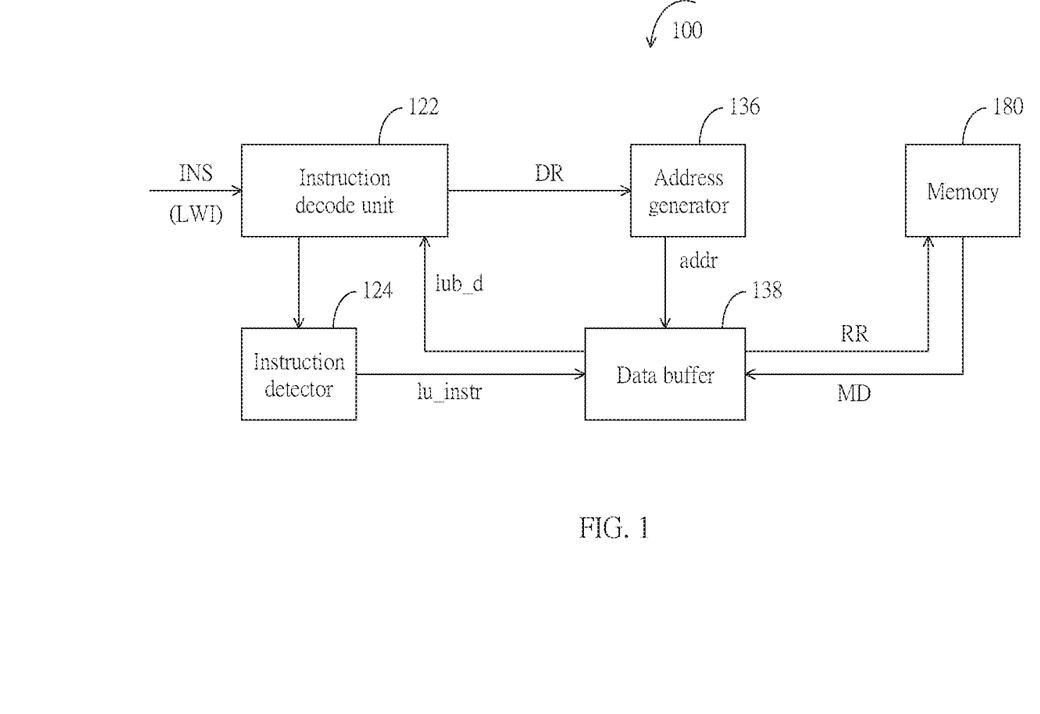
FIG. 1 is a block diagram illustrating an exemplary processor circuit in accordance with some embodiments of the present disclosure.

FIG. 1 is a block diagram illustrating an exemplary processor circuit 100 in accordance with some embodiments of the present disclosure. The processor circuit 100 can be used to reduce/avoid a load-use stall caused by execution of one or some instructions in an instruction stream. The processor circuit 100 may include, but is not limited to, an instruction decode unit 122, an instruction detector 124, an address generator 136 and a data buffer 138. The instruction decode unit 122 is configured to decode a plurality of consecutive instructions in an instruction stream INS, and can output respective decoding results of the instructions in sequence. For example, the instruction decode unit 122 can be configured to decode a load instruction LWI in an instruction stream INS to thereby generate a decoding result DR. As another example, the instruction decode unit 122 can be configured to decode other instructions in the instruction stream INS, such as a store instruction or a manipulation instruction, to thereby generate corresponding decoding results.

The instruction detector 124, coupled to the instruction decode unit 122, is configured to detect if the instruction stream INS includes one or more load instructions that are in a load-use scenario. When in the load-use scenario, a load instruction may cause a load-use stall. For example, the instruction detector 124 can be configured to receive the instruction stream INS which is temporarily stored in the instruction decode unit 122, thereby detecting the instruction stream INS. As another example, the instruction detector 124 can be configured to directly receive the instruction stream INS without through the instruction decode unit 122, thereby detecting the instruction stream INS.

In the present embodiment, a load instruction in the load-use scenario may include a load-use instruction, which may cause a load-use stall when a subsequent instruction is executed. For example, when the instruction detector 124 detects that the load instruction LWI is a load-use instruction, it means that the load-use stall will take place if the processor circuit 100 uses an execution result of the load instruction LWI to execute an instruction in the instruction stream INS which comes after the load instruction LWI. In the present embodiment, the instruction detector 124 can be configured to determine if using the execution result of the load instruction LWI to execute the instruction would cause a load-use data hazard. When it is determined that using the execution result of the load instruction LWI to execute the instruction would cause the load-use data hazard, the instruction detector 124 can detect that the load instruction LWI is a load-use instruction.

In addition, the instruction detector 124 can be configured to output an indication signal lu_instr, which can indicate if an instruction currently processed by the instruction decode unit 122 is a load instruction that is in the load-use scenario. For example, in some cases where the instruction currently processed by the instruction decode unit 122 is the load instruction LWI, the indication signal lu_instr can indicate whether the load instruction LWI is a load-use instruction.

The address generator 136, coupled to the instruction decode unit 122, can be configured to generate an address associated with each instruction according to a decoding result of the instruction. For example, the address generator 136 can generate an address addr according to the decoding result DR of the load instruction LWI, wherein the address addr serves as an address requested by the load instruction LWI.

The data buffer 138 is coupled to the instruction detector 124 and the address generator 136. When the instruction detector 124 detects that a load instruction may cause a load-use stall, the data buffer 138 can be configured to store an address requested by the load instruction, wherein the address is generated by the address generator 136. Also, the data buffer 138 can store data, requested by the load instruction, according to the address requested by the load instruction. In the present embodiment, when the instruction detector 124 detects that the load instruction LWI is a load-use instruction, the data buffer 138 can store the address addr generated by the address generator 136, and store data lub_d according to the address addr. The data lub_d serves as data requested by the load instruction LWI.

For example, in some cases where the data requested by the load instruction LWI has not been stored in the data buffer 138, the data buffer 138 can send a read request RR to a memory 180 in order to read data MD pointed to by the address addr in the memory 180. The data MD can serve as the data requested by the load instruction LWI. In some embodiments, the memory 180 can be a local memory or a cache memory of the processor circuit 100. In some embodiments, the memory 180 can be an external memory or an auxiliary memory which is external to the processor circuit 100.

It is worth noting that in some cases where the processor circuit 100 needs to use the data requested by the load instruction LWI to execute a pending instruction, the data buffer 138 can store the data requested by the load instruction LWI, such as the data lub_d. As a result, the instruction decode unit 122 can obtain the data lub_d from the data buffer 138 without waiting for the memory 180, such as a cache memory or an external memory, to return the execution result of the load instruction LWI, and provide the data lub_d to the processor circuit 100 for executing the pending instruction. A load-use stall caused by execution of the pending instruction can be reduce/avoid.

For illustrative purposes, the proposed data processing scheme is described below with reference to a processor circuit utilizing pipeline architecture. However, this is not intended to limit the scope of the present disclosure. The proposed data processing scheme can be employed to other circuit structures, each of which uses an execution result of a previous instruction to execute a subsequent instruction, without departing from the scope of the present disclosure.

Figure 2:
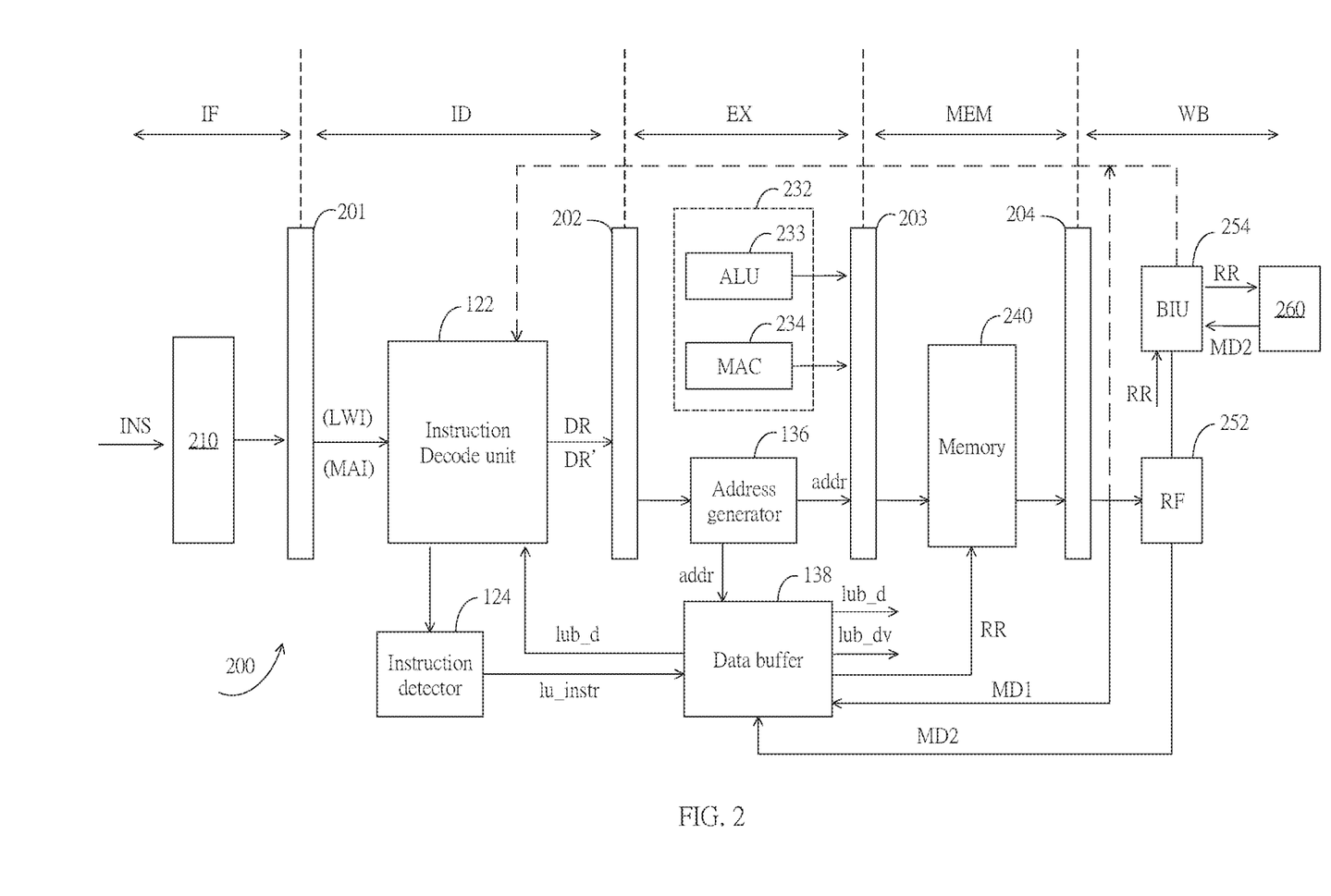
FIG. 2 is an implementation of the processor circuit shown in FIG. 1 in accordance with some embodiments of the present disclosure.

FIG. 2 is an implementation of the processor circuit 100 shown in FIG. 1 in accordance with some embodiments of the present disclosure. To facilitate understanding of the present disclosure, the processor circuit 200 can be implemented as a pipelined processor having pipeline architecture. The pipeline architecture may include five pipeline stages, which can be implemented using an instruction fetch stage IF, an instruction decode stage ID, an execution stage EX, a memory access stage MEM and a write back stage WB, respectively. However, this is not intended to limit the scope of the present disclosure. In some embodiments, the five pipeline stages can be implemented using an instruction fetch stage, an instruction decode stage, an operand fetch stage, an execution stage and a write back stage. In some embodiments, the processor circuit 200 can use pipeline architecture which has more or less than five pipeline stages. Such modifications and alternatives also fall within the spirit and scope of the present disclosure.

In the present embodiment, the processor circuit 200 may include the instruction decode unit 122, the instruction detector 124, the address generator 136 and the data buffer 138 shown in FIG. 1. The instruction decode unit 122 and the instruction detector 124 can be located in a same pipeline stage such as the instruction decode stage ID. The address generator 136 and the data buffer 138 can be located in a same pipeline stage such as the execution stage EX. Pipeline stalls can be reduce/avoid accordingly. Associated description will be provided later.

In addition, the processor circuit 200 may further include, but is not limited to, a plurality of pipeline registers 201-204, an instruction fetch unit 210, an execution unit 232, a memory 240, a register file (RF) 252 and a bus interface unit (BIU) 254. The pipeline register 201 can be referred to as an IF/ID register because of being located between the instruction fetch stage IF and the instruction decode stage ID. Similarly, the pipeline register 202, the pipeline register 203 and the pipeline register 204 can be referred to as an ID/EX register, an EX/MEM register and a MEM/WB register, respectively.

The instruction fetch unit 210, located in the instruction fetch stage IF, is configured to store the instruction stream INS, and store a corresponding instruction in the instruction stream INS into the pipeline register 201 according to an address provided by a program counter (not shown in FIG. 2).

The execution unit 232, located in the execution stage EX, is configured to execute an instruction according to a decoding result of the instruction provided by the pipeline register 202, and store an execution result of the instruction into the pipeline register 203. The decoding result of the instruction may include an address and data needed for execution of the instruction. In the present embodiment, the execution unit 232 may include, but is not limited to, an arithmetic logic unit (ALU) 233 and a multiplier-accumulator unit (MAC) 234.

The memory 240, located in the memory access stage MEM, can serve as an embodiment of the memory 180 shown in FIG. 1. For example, the memory 240 can be implemented as a cache memory of the processor circuit 200. In the present embodiment, the memory 240 is configured to perform a memory access operation according to an execution result of an instruction execution result provided by the pipeline register 203. For example, during a write operation, the memory 240 can store data at a location pointed to by the address addr according to the instruction execution result. As another example, during a read operation, the memory 240 can output the data MD1 pointed to by the address addr according to the instruction execution result.

Each of the register file 252 and the bus interface unit 254 can be located in the write back stage WB. The register file 252 is configured to store data, which comes from the memory 240 and is temporarily stored in the pipeline register 204. The bus interface unit 254 can serve as a data transmission interface between the processor circuit 200 and an external memory 260. In some embodiments, the register file 252 can be further configured to store data that is to be written into the external memory 260, or store data MD2 read from the external memory 260.

Figure 3:
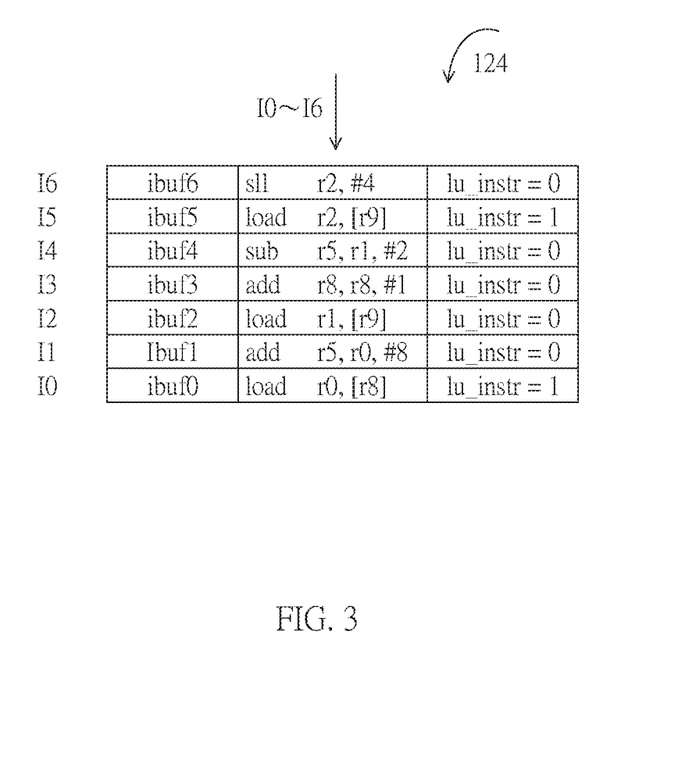
FIG. 3 is an implementation of instruction detection associated with the instruction detector shown in FIG. 2 in accordance with some embodiments of the present disclosure.

Referring to FIG. 3 and also to FIG. 2, an implementation of instruction detection associated with the instruction detector 124 shown in FIG. 2 is illustrated in FIG. 3 in accordance with some embodiments of the present disclosure. In the present embodiment, the instruction detector 124 can be configured to receive a plurality of instructions I0-I6 in the instruction stream INS that are transmitted to the instruction decode unit 122 in sequence. Also, the instruction detector 124 can be configured to temporarily store the instructions I0-I6 into a plurality of storage units ibuf0-ibuf6 in the instruction detector 124, respectively. For illustrative purposes, the instructions I0-I6 can be implemented using a load instruction, an add instruction, a load instruction, an add instruction, a subtract (sub) instruction, a load instruction, and a shift left logical (sll) instruction, respectively. The instruction detector 124 can be configured to perform decoding operations on the instructions I0-I6 to detect if a load instruction, such as the instruction I0, instruction I2 or instruction I5, is a load-use instruction.

For example, before data requested by the instruction I0, which is data pointed to by an address [r8] in the memory 240, is loaded from the memory 240 into the register r0 (located in the instruction decode unit 122; not shown in FIG. 2), the instruction I1, i.e, an add instruction executed after the instruction I0, will enter the execution stage EX and need to use data stored in the register r0. As a result, the instruction detector 124 can detect that the instruction I0 is a load-use instruction in a load-use scenario. In addition, when the instruction I0 enters the execution stage EX, the instruction detector 124 can output the indication signal lu_instr having a first signal level such as a high logic level, thus indicating that the instruction I0 is a load-use instruction.

Similarly, before data requested by the instruction I5, which is data pointed to by an address [r9] in the memory 240, is loaded from the memory 240 into the register r2 (located in the instruction decode unit 122; not shown in FIG. 2), the instruction I6, i.e. a shift left logical instruction executed after the instruction I5, will enter the execution stage EX and need to use data stored in the register r2. As a result, the instruction detector 124 can detect that the instruction I5, is a load-use instruction.

As for the instruction I2, data needed by the instruction I4 executed after the instruction I2, which is data stored in the register r1 of the instruction decode unit 122, comes from data requested by the instruction I2, which is data pointed to by the address [r9] in the memory 240. However, as the data requested by the instruction I2 has been loaded into the register r1 from the memory 240 before the instruction I4 enters the execution stage EX, the instruction detector 124 can detect that the instruction I5 is not a load-use instruction and output the indication signal lu_instr having a second signal level such as a low logic level.

It is worth noting that the type, order and number of the instructions shown in FIG. 3 are provided for illustrative purpose, and are not intended to limit the scope of the present disclosure. As those skilled in the art should appreciate the operations of the instructions I0-I6 shown in FIG. 3, further description associated with each instruction is omitted here for brevity.

According to the instruction detection described above, the instruction detector 124 can detect if the load instruction LWI is a load-use instruction in the instruction decode stage ID. For example, in some cases where the load instruction LWI is implemented using the instruction I0 or instruction I5, when the load instruction LWI enters the instruction decode stage ID, the instruction detector 124 can detect that the load instruction LWI is a load-use instruction, and output the indication signal lu_instr having the first signal level. Also, in some cases where the load instruction LWI is implemented using the instruction I2, when the load instruction LWI enters the instruction decode stage ID, the instruction detector 124 can detect that the load instruction LWI is not a load-use instruction, and output the indication signal lu_instr having the second signal level.

After the instruction detector 124 detect that the load instruction LWI is a load-use instruction, the data requested by the load instruction LWI can be provided to the instruction decode unit 122 by the data buffer 138 in a next pipeline stage, i.e. the execution stage EX. As a result, in some cases where an instruction following the load instruction LWI needs to use the data requested by the load instruction LWI immediately, data needed by the instruction can be ready when the instruction is in the instruction decode stage ID.

Figure 4:
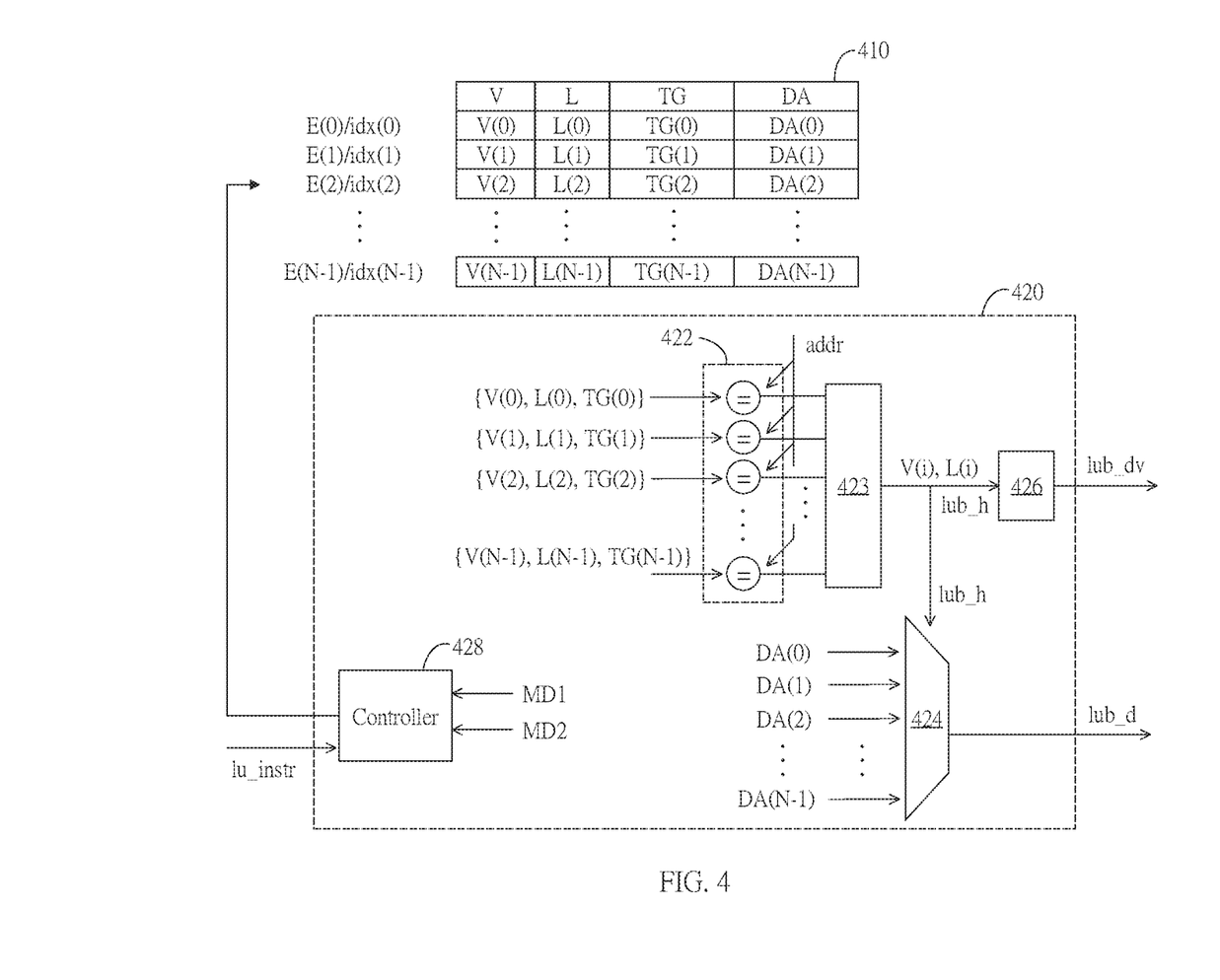
FIG. 4 is an implementation of the data buffer shown in FIG. 2 in accordance with some embodiments of the present disclosure.

Referring to FIG. 4 and also to FIG. 2, an implementation of the data buffer 138 shown in FIG. 2 is illustrated in FIG. 4 in accordance with some embodiments of the present disclosure. The data buffer 138 may include, but is not limited to, a storage space 410 and a control circuit 420. The storage space 410 can use a flip-flop (no shown in FIG. 4) as a storage unit to complete data access in a single clock cycle. In the present embodiment, the storage space 410 may include N entries E(0)-E(N-1), which correspond to N index values idx(0)-idx(N-1) respectively. N is a positive integer greater than 1. Each entry may include, but is not limited to, a valid bit field V, a lock bit field L, a tag field TG and a data tag DA. The valid bit field V can indicate if information is stored in the entry. Contents of the respective valid bit fields V of the N entries E(0)-E(N-1) can be represented by valid bits V(0)-V(N-1), respectively. The lock bit field L can indicate if the entry is locked, thereby protecting information stored in the entry from being modified. Contents of the respective lock bit fields L of the N entries E(0)-E(N-1) can be represented by lock bits L(0)-L(N-1), respectively. The tag field TG can be used to identify data stored in the data tag DA of the entry. For example, the tag field TG can indicate an address of the data stored in the entry in the memory 240 or the external memory 260. Contents of the respective tag fields TG of the N entries E(0)-E(N-1) can be represented by tags TG(0)-TG(N-1), respectively. Contents of the respective data tag fields DA of the N entries E(0)-E(N-1) can be represented by data DA(0)-DA(N-1), respectively.

The control circuit 420 includes, but is not limited to, a comparison circuit 422, a buffer 423, a selection circuit 424, a logic circuit 426 and a controller 428. The comparison circuit 422 is configured to compare the address addr with each of the tags TG(0)-TG(N-1) to thereby generate a hit signal lub_h. For example, when the address addr matches one of the tags TG(0)-TG(N-1), the hit signal lub_h can have a signal level such as a high logic level. When the address addr does not match any of the tags TG(0)-TG(N-1), the hit signal lub_h can have another signal level such as a low logic level. In the present embodiment, when the hit signal lub_h indicates that the address addr matches the tag TG(i) (i is a natural number less than N), the comparison circuit 422 can store the hit signal lub_h, and the valid bit V(i) and lock bit L(i) corresponding to the tag TG(i) into the buffer 423.

The selection circuit 424 can be configured to output one of the data DA(0)-DA(N-1) according to the hit signal lub_h. For example, when the hit signal lub_h indicates that the address addr matches the tag TG(i) (i is a natural number less than N), the selection circuit 424 can output the data DA(i) corresponding to the tag TG(i) as the data lub_d.

The logic circuit 426 can be configured to output a valid signal lub_dv to indicate whether the data lub_d is valid/available. For example, in some cases where the hit signal lub_h indicates that the address addr matches the tag TG(i) (i is a natural number less than N), when the valid bit V(i) indicates that information is stored in the entry E(i), and the lock bit L(i) indicates that the entry E(i) is not locked, the valid signal lub_dv can have a signal level, e.g. a high logic level, to indicate the data lub_d is valid/available. When the valid signal lub_dv indicates that the data lub_d is valid/available, the instruction decode unit 122 can obtain the data requested by the load instruction LWI, e.g. the data lub_d, from the data buffer 138, thereby reducing/avoiding a load-use stall.

The controller 428 is configured to selectively access the storage space 410 according to the indication signal lu_instr. For example, when the indication signal lu_instr indicates that the load instruction LWI is a load-use instruction, the controller 428 can access an entry of the storage space 410 according to address addr, thereby updating at least one of the valid bit field V, the lock bit field L, the tag field TG and the data tag DA of the entry. When the indication signal lu_instr indicates that the load instruction LWI is not a load-use instruction, the controller 428 may not modify information stored in the storage space 410. In other words, the storage space 410 can be configured to store information which is associated with a load-use instruction only.

It is worth noting that, in operation, the control circuit 420 can keep the information stored in the storage space 410 consistent with the information stored in the memory 240 or the information stored in the external memory 260. For example, when the processor circuit 200 is configured to process a memory access instruction MAI, the instruction decode unit 122 is configured to decode the memory access instruction MAI to generate a decoding result DR'. The memory access instruction MAI may include, but is not limited to, a store instruction for writing data into a memory, and a load instruction for reading data stored in a memory. In addition, the address generator 136 is configured to generate the address addr according to the decoding result DR', wherein the address addr can be an address requested by the memory access instruction MAI. The control circuit 420 can check if the address addr has been stored in the storage space 410. When the address addr has been stored in the storage space 410, the control circuit 420 can update the data pointed to by the address addr in the storage space 410 with the data requested by the memory access instruction MAI. As a result, the data that the instruction decode unit 122 obtains directly from the data buffer 134 can be consistent with the data stored in a memory, such as the memory 240 or the external memory 260.

Figure 5:
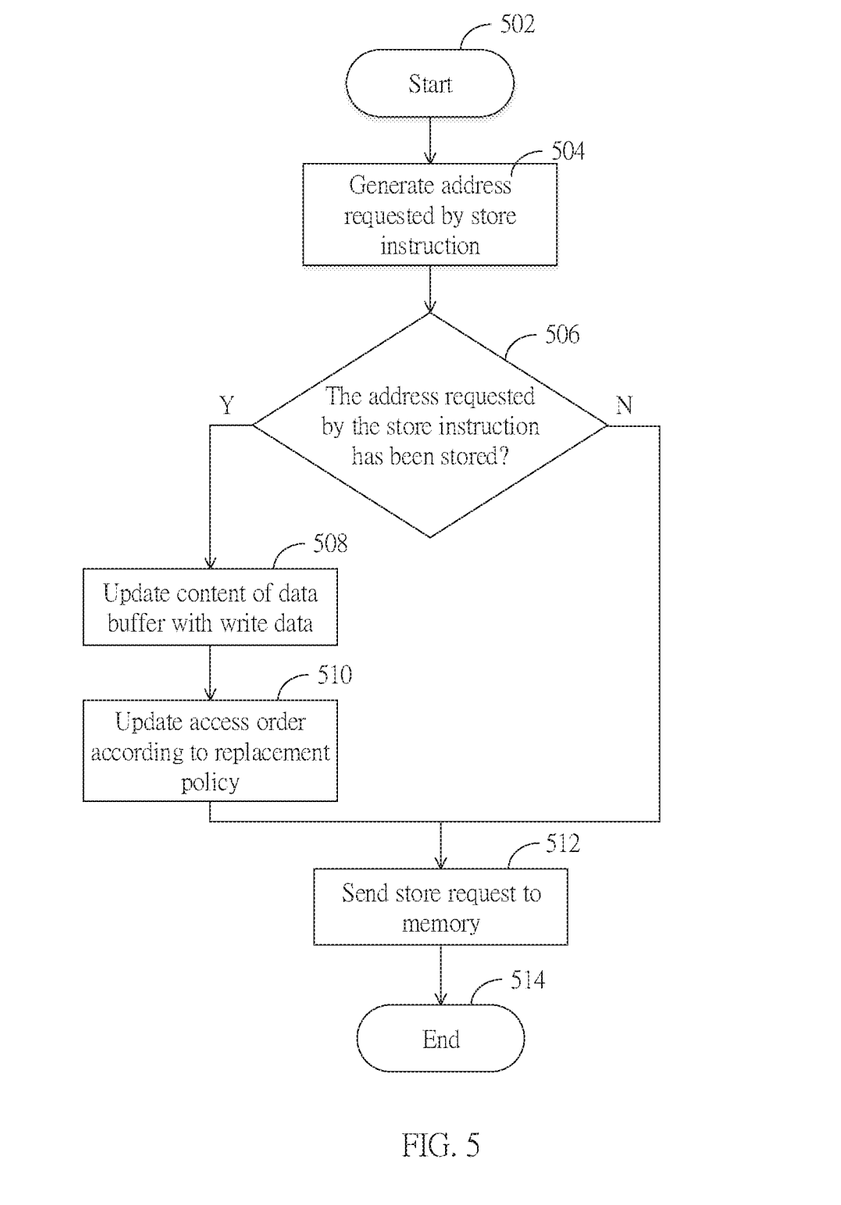
FIG. 5 is a flow chart of an exemplary data processing method associated with the processor circuit shown in FIG. 2 for processing a memory access instruction in accordance with some embodiments of the present disclosure.

FIG. 5 is a flow chart of an exemplary data processing method associated with the processor circuit 200 shown in FIG. 2 for processing the memory access instruction MAI in accordance with some embodiments of the present disclosure. In the present embodiment, the data buffer 138 included in the processor circuit 200 shown in FIG. 2 can utilize the architecture shown in FIG. 4 to execute associated operations. In addition, the memory access instruction MAI can be implemented using a store instruction.

Referring to FIG. 2, FIG. 4 and FIG. 5, in step 502, the execution stage EX can begin to execute the store instruction. The store instruction is configured to store write data into the memory 240, wherein the write data is stored into a register of the instruction decode unit 122. In step 504, the address generator 136 can generate the address addr according to a decoding result of the store instruction. The generated address addr is an address requested by the store instruction in the present embodiment. Also, the address generator 136 can output the address addr to the data buffer 138.

In step 506, the comparison circuit 422 can compare the address addr with the tags TG(0)-TG(N-1) to check if the address addr has been stored in the storage space 410. If it is checked that the address addr has been stored in the storage space 410, the data processing method proceeds to step 508. For example, when the hit signal lub_h has a high logic level, the data processing method proceeds to step 508.

If it is checked that the address addr is not stored in the storage space 410, the data processing method proceeds to step 512. For example, when the hit signal lub_h has a low logic level, the data processing method proceeds to step 512.

In step 508, the controller 428 can update the data field DA of an entry, which is pointed to by the address addr, in the storage space 410 with the write data. For example, when the address addr matches the tag TG(i), the controller 428 can update the data DA(i) of the entry E(i) with the write data.

In step 510, the controller 428 can update an access order of the N entries E(0)-E(N-1) according to a replacement policy. For example, the controller 428 can utilize a least recently used (LRU) replacement policy. As a result, the controller 428 can set the entry E(i) that is accessed most recently as the most frequently used entry. In some embodiments, the controller 428 can utilize a not most recently used (NMRU) replacement policy, a random replacement policy or other replacement policies. In the embodiments where the controller 428 utilizes the random replacement policy, step 510 may be optional.

In step 512, the execution stage EX can send a store request to the memory 240 through the pipeline register 203, wherein the store request includes the write data and the address addr generated by the address generator 136. If an address matching the address addr is stored in the memory 240, the memory 240 can store the write data thereinto. If the memory 240 does not store any address matching the address addr, the store request can be transmitted to the external memory 260 through the bus interface unit 254, so as to store the write data at a storage location pointed to by the address addr in the external memory 260. In step 514, the store instruction is completed.

Figure 6:
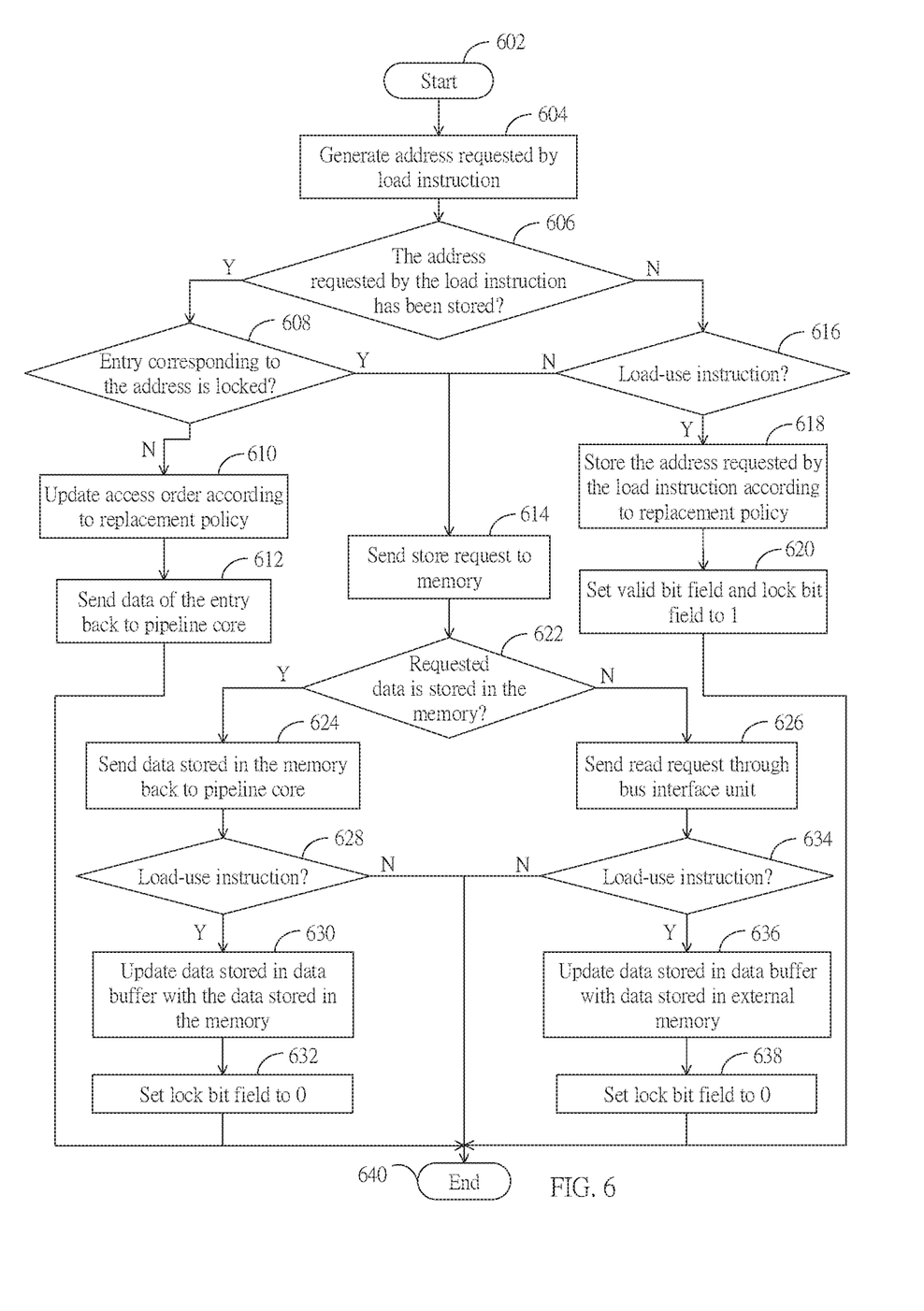
FIG. 6 is a flow chart of an exemplary data processing method associated with the processor circuit shown in FIG. 2 for processing a memory access instruction in accordance with some embodiments of the present disclosure.

FIG. 6 is a flow chart of an exemplary data processing method associated with the processor circuit 200 shown in FIG. 2 for processing the memory access instruction MAI in accordance with some embodiments of the present disclosure. In the present embodiment, the data buffer 138 included in the processor circuit 200 shown in FIG. 2 can utilize the architecture shown in FIG. 4 to execute associated operation. In addition, the memory access instruction MAI can be implemented using a load instruction.

Referring to FIG. 2, FIG. 4 and FIG. 6, in step 602, the execution stage EX can begin to execute the load instruction. The load instruction is configured to load read data into a register of the instruction decode unit 122. In step 604, the address generator 136 can generate the address addr according to a decoding result of the load instruction. The generated address addr is an address requested by the load instruction in the present embodiment. Also, the address generator 136 can output the address addr to the data buffer 138.

In step 606, the comparison circuit 422 can compare the address addr with the tags TG(0)-TG(N-1) to check if the address addr has been stored in the storage space 410. If it is checked that the address addr has been stored in the storage space 410, the data processing method proceeds to step 608. Otherwise, the data processing method proceeds to step 616.

In step 608, the controller 428 can check if the entry pointed to by the address addr points is locked. For example, in some cases where the address addr matches the tag TG(i), the controller 428 can be configured to check if the valid bit field L of the entry E(i) has a bit pattern, thereby determining whether the entry E(i) is locked. If it is determined that the entry E(i) is not locked, the data processing method proceeds to step 610. Otherwise, the data processing method proceeds to step 614. In the present embodiment, when a bit value of the lock bit L(i) of the entry E(i) is equal to 0, the controller 428 can determine that the entry E(i) is not locked. When the bit value of the lock bit L(i) of the entry E(i) is equal to 1, the controller 428 can determine that the entry E(i) is locked.

In step 610, the controller 428 can update an access order of the N entries E(0)-E(N-1) according to a replacement policy. For example, the controller 428 can utilize an LRU replacement policy. As a result, the controller 428 can set the entry E(i) that is accessed most recently as the most frequently used entry. In some embodiments, the controller 428 can utilize an NMRU replacement policy, a random replacement policy or other replacement policies. In the embodiments where the controller 428 utilizes the random replacement policy, step 610 may be optional.

In step 612, the selection circuit 424 can use the data DA(i) of the entry E(i) as the data lub_d. As a result, the data buffer 138 can send the data lub_d back to a pipeline core, such as the instruction decode unit 122. In addition, the logic circuit 426 can output the valid signal lub_dv having a signal level, such as a high logic level, to thereby indicate that the data lub_d is valid/available. In step 614, the data buffer 138 can send the read request RR to the memory 240 to read the data pointed to by the address addr in the memory 240, wherein the read request RR includes the address addr.

In step 616, the controller 428 can determine if the load instruction is a load-use instruction according to the indication signal lu_instr. If yes, the data processing method proceeds to step 618. Otherwise, the data processing method proceeds to step 614.

In step 618, the controller 428 can select an entry from the N entries E(0)-E(N-1) according to a replacement policy, and store the address addr into the tag field TG of the entry. In the present embodiment, the controller 428 can utilize an LRU replacement policy, and store the address addr into the tag field TG of the least recently used entry E(i). In some embodiments, the controller 428 can utilize other replacement policies to store the address addr.

In step 620, the controller 428 can set a content of the valid bit field V of the entry E(i) such that the valid bit field V can indicate that the entry E(i) has included information stored therein. For example, the controller 428 can set a bit value of the valid bit V(i) to 1. In addition, as data requested by the load instruction has not been stored into the data field DA of the entry E(i), the controller 428 can set the lock bit field L of the entry E(i) to a bit pattern to protect the information stored in the entry E(i) from being modified by at least one other instruction different from the load instruction. In the present embodiment, the controller 428 can set the bit value of the lock bit L(i) to 1.

In step 622, the memory 240 can check if the data requested by the load instruction is stored in the memory 240 according to the read request RR. If it is checked that the data requested by the load instruction is stored in the memory 240, the data processing method proceeds to step 624. Otherwise, the data processing method proceeds to step 626. For example, if it is checked that the memory 240 includes an address matching the address addr, it is determined that the data requested by the load instruction is stored in the memory 240.

In step 624, the memory 240 can send back the data MD1, which is pointed to by the address addr in the memory 240, to a pipeline core such as the instruction decode unit 122. The data MD1 can serve as the data requested by the load instruction.

In step 626, the data buffer 138 can send the read request RR to the external memory 260 through the bus interface unit 254, thereby reading the data MD2 pointed to by the address addr in the external memory 260. The data MD2 can serve as the data requested by the load instruction.

In step 628, the controller 428 can determine whether to update the information stored in the storage space 410 according to the indication signal lu_instr. If it is determined that the information stored in the storage space 410 needs to be updated, the data processing method proceeds to step 630. Otherwise, the data processing method proceeds to step 640. For example, when the indication signal lu_instr has a signal level such as a high logic level, the controller 428 can determine that the information stored in the storage space 410 needs to be updated.

In step 630, the controller 428 can update the data field DA of the entry E(i) with the data MD1 returned by the memory 240. In step 632, as each of the address addr and the data requested by the load instruction is stored in the entry E(i), the controller 428 can set the lock bit field L of the entry E(i) to another bit pattern, thereby allowing the information stored in the entry E(i) to be modified. In the present embodiment, the controller 428 can set the bit value of the lock bit L(i) to 0.

In step 634, the controller 428 can determine whether to update the information stored in the storage space 410 according to the indication signal lu_instr. If it is determined that the information stored in the storage space 410 needs to be updated, the data processing method proceeds to step 636. Otherwise, the data processing method proceeds to step 640. For example, when the indication signal lu_instr has a signal level such as a high logic level, the controller 428 can determine that the information stored in the storage space 410 needs to be updated.

In step 636, the controller 428 can update the data field DA of the entry E(i) with the data MD2 returned by the external memory 260. In step 638, as each of the address addr and the data requested by the load instruction is stored in the entry E(i), the controller 428 can set the lock bit field L of the entry E(i) to another bit pattern, thereby allowing the information stored in the entry E(i) to be modified. In the present embodiment, the controller 428 can set the bit value of the lock bit L(i) to 0. In step 640, the load instruction is completed.

Figure 7:
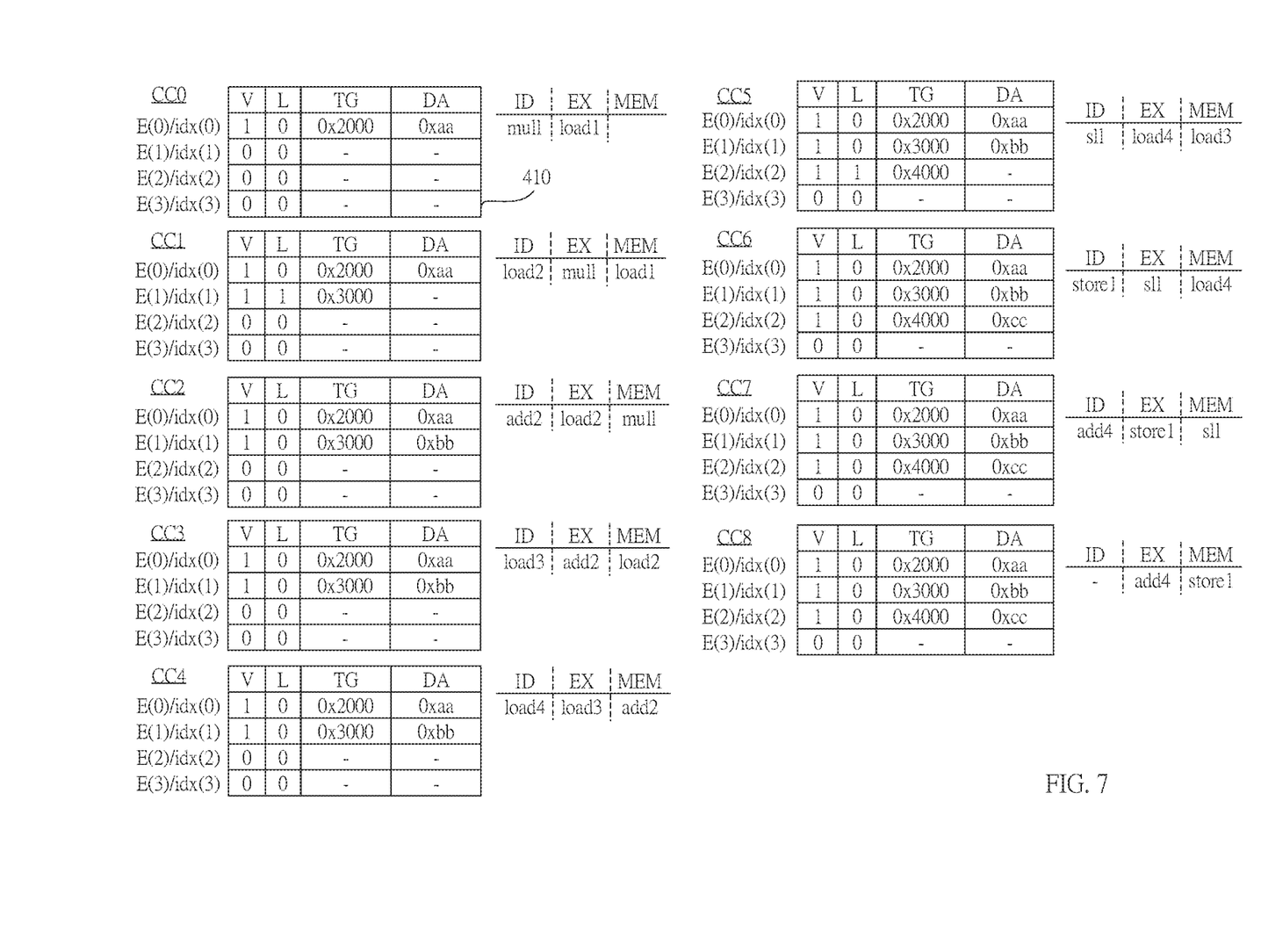
FIG. 7 is a diagram illustrating information stored in the storage space shown in FIG. 4 in a plurality of consecutive clock cycles in accordance with some embodiments of the present disclosure.

To facilitate understanding of the present disclosure, the proposed data processing scheme is described below with reference to some embodiments where a data buffer operates in response to a plurality of consecutive instructions. FIG. 7 is a diagram illustrating information stored in the storage space 410 shown in FIG. 4 in a plurality of consecutive clock cycles CC0-CC8 in accordance with some embodiments of the present disclosure. In the present embodiment, the storage space 410 may include four entries E(0)-E(3) (i.e. N is equal to 4) to store information needed for instruction execution. In addition, the contents of the tag field TG and the data field DA of each entry can be represented in hexadecimal notation, i.e. "0x".

Referring to FIG. 2, FIG. 4 and FIG. 7, when the clock cycle CC0 begins, an address 0x2000 and data 0xaa have been stored in the entry E(0) in the storage space 410, wherein the entry E(0) corresponds to an index value idx(0). In addition, the valid bit field V and the lock bit field L of the entry E(0) are set to 1 and 0, respectively.

During the clock cycle CC0, a load instruction load1 enters the execution stage EX, and a multiply instruction mull enters the instruction decode stage ID, wherein the multiply instruction mull would not use data stored in a destination register for the load instruction load1. The address generator 136 generates an address 0x3000 (i.e. the address addr) requested by the load instruction load1 according to a decoding result of the load instruction load1. In addition, the load instruction load1 is a load-use instruction. As a result, the data buffer 138 can receive the address 0x3000 and the indication signal lu_instr having a high logic level.

As the address 0x3000 has not been stored in the storage space 410, the comparison circuit 422 can generate the hit signal lub_h having a low logic level. The controller 428 can select the entry E(1) according to a replacement policy, and store the address addr into the tag field TG of the entry E(1) accordingly. In addition, the controller 428 can set each of the valid bit field V and the lock bit field L of the entry E(1) to 1. In some embodiments, operations involved in the clock cycle CC0 can be implemented using steps 602, 604, 606, 616, 618, and 620 shown in FIG. 6.

Next, when the clock cycle CC1 subsequent to the clock cycle CC0 begins, the address 0x3000 has been stored into the entry E(1) of the storage space 410, and each of the valid bit field V and the lock bit field L of the entry E(1) is set to 1. During the clock cycle CC1, the load instruction load1 enters the memory access stage MEM, the multiply instruction mull enters the execution stage EX, and another load instruction load2 enters the instruction decode stage ID. The controller 428 can receive the data MD1 returned by the memory 240, which is data 0xbb pointed to by the address 0x3000 in the memory 240. As a result, the controller 428 can set the data field DA of the entry E(1) to the data 0xbb, and set the lock bit field L of the entry E(1) to 0. In some embodiments, operations involved in the clock cycle CC1 can be implemented using steps 614, 622, 624, 628, 630 and 632 shown in FIG. 6.

During the clock cycle CC2 subsequent to the clock cycle CC1, the multiply instruction mull enters the memory access stage MEM, the load instruction load2 enters the execution stage EX, and an add instruction add2 enters the instruction decode stage ID. The address generator 136 generates the address 0x3000 (i.e. the address addr) requested by the load instruction load2 according to a decoding result of the load instruction load2. The load instruction load2 is a load-use instruction, wherein the add instruction add2 needs to use data stored in a destination register for the load instruction load2.

As the address 0x3000 requested by the load instruction load2 has been stored in the entry E(1), the comparison circuit 422 can generate the hit signal lub_h having a high logic level. The logic circuit 426 can output the valid signal lub_dv having a high logic level. The selection circuit 424 can use the data 0 xbb stored in the entry E(1) as the data lub_d, such that the data buffer 138 can return the data 0xbb requested by the load instruction load2 to the instruction decode unit 122. As a result, the data 0xbb required by the add instruction add2 is ready before the add instruction add2 enters the execution stage EX. In some embodiments, operations involved in the clock cycle CC2 can be implemented using steps 604, 606, 608, 610 and 612 shown in FIG. 6.

During the clock cycle CC3 subsequent to the clock cycle CC2, the load instruction load2 enters the memory access stage MEM, the add instruction add2 enters the execution stage EX, and another load instruction load3 enters the instruction decode stage ID. As the data 0xbb required by the add instruction add2 is ready, the processor circuit 200 can execute the add instruction add2 successfully.

During the clock cycle CC4 subsequent to the clock cycle CC3, the add instruction add2 enters the memory access stage MEM, the load instruction load3 enters the execution stage EX, and another load instruction load4 enters the instruction decode stage ID. The address generator 136 generates an address 0x4000 requested by the load instruction load3 according to a decoding result of the load instruction load3. In addition, the load instruction load3 is a load-use instruction. As a result, the data buffer 138 can receive the address 0x4000 and the indication signal lu_instr having a high logic level.

As the address 0x4000 has not yet been stored in the storage space 410, the comparison circuit 422 can generate the hit signal lub_h having a low logic level. The controller 428 can select the entry E(2) according to a replacement policy, and store the address addr into the tag field TG of the entry E(2) accordingly. In addition, the controller 428 can set each of the valid bit field V and the lock bit field L of the entry E(2) to 1. In some embodiments, operations involved in the clock cycle CC4 can be implemented using steps 602, 604, 606, 616, 618 and 620 shown in FIG. 6.

During the clock cycle CC5 subsequent to the clock cycle CC4, the load instruction load3 enters the memory access stage MEM, the load instruction load4 enters the execution stage EX, and a shift left logical instruction sll enters the instruction decode stage ID. The address generator 136 generates the address 0x4000 requested by the load instruction load4 according to a decoding result of the load instruction load4. In addition, the load instruction load4 is a load-use instruction. As a result, the data buffer 138 can receive the address 0x4000 and the indication signal lu_instr having a high logic level. Moreover, the controller 428 can receive the data MD1 returned by the memory 240, which is data 0xcc requested by the load instruction load3.

As the address 0x4000 requested by the load instruction load4 has been stored in the entry E(2), the comparison circuit 422 can generate the hit signal lub_h having a high logic level. It is worth noting that, before the controller 428 sets the data field DA of the entry E(2) to the data 0xcc, the lock bit field L of the entry E(2) is still 1. As a result, the valid signal lub_dv still has a low logic level, meaning that data requested by the load instruction load4 is not ready. After the data field DA of the entry E(2) is set to the data 0xcc, the controller 428 can set the lock bit field L of the entry E(2) to 0, and provide the data 0xcc stored in the entry E(2) to the instruction decode unit 122. With the use of the lock bit field L, the processor circuit 200 can ensure that the data loaded by the load instruction load4 in the execution stage EX is the data requested by the load instruction load3. In some embodiments, operations involved in the clock cycle CC5 can be implemented using steps 604, 606, 608, 610 and 612 shown in FIG. 6.

During the clock cycle CC6 subsequent to the clock cycle CC5, the load instruction load4 enters the memory access stage MEM, the shift left logical instruction sll enters the execution stage EX, and a store instruction store1 enters the instruction decode stage ID.

During the clock cycle CC7 subsequent to the clock cycle CC6, the shift left logical instruction sll enters the memory access stage MEM, the store instruction store1 enters the execution stage EX, and an add instruction add4 enters the instruction decode stage ID. The store instruction store1 is configured to store write data 0xdd in the memory 240. The address generator 136 is configured to generate the address 0x2000 requested by the store instruction store1 according to a decoding result of the store instruction store1. As the address 0x2000 requested by the store instruction store1 has been stored in the entry E(0), the comparison circuit 422 can generate the hit signal lub_h having a high logic level. In addition, the controller 428 can update the data field DA of the entry E(0) with the write data 0xdd. In some embodiments, operations involved in the clock cycle CC7 can be implemented using steps 502, 504, 506, 508 and 510 shown in FIG. 5.

During the clock cycle CC8 subsequent to the clock cycle CC7, the store instruction store1 enters the memory access stage MEM, and an add instruction add4 enters the execution stage EX. The memory 240 can store the write data 0xdd at a storage location pointed to by the address 0x2000 in the memory 240.

As those skilled in the art can appreciate the operations in each clock cycle shown in FIG. 7 after reading the above paragraphs directed to FIG. 1 to FIG. 6, further description is omitted here for brevity.

Figure 8:
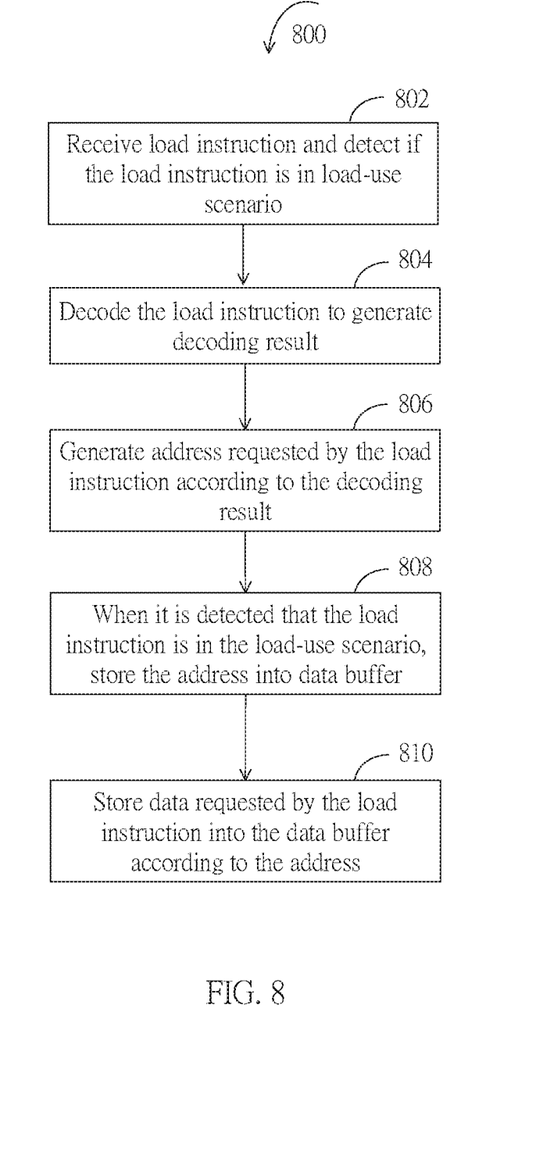
FIG. 8 is a flow chart of an exemplary data processing method in accordance with some embodiments of the present disclosure.

The proposed data processing scheme may be summarized in FIG. 8. FIG. 8 is a flow chart of an exemplary data processing method in accordance with some embodiments of the present disclosure. The data processing method 800 is described with reference to the processor circuit 200 shown in FIG. 2. However, those skilled in the art can understand that the data processing method 800 can be used to control the processor circuit 100 shown in FIG. 1 without departing from the scope of the present disclosure. Additionally, in some embodiments, other operations may be performed in the data processing method 800. In some embodiments, operations of the data processing method 800 may be performed in a different order and/or vary.

In step 802, a load instruction is received and detected to determine whether the load instruction is in a load-use scenario. For example, the instruction detector 124 can detect if the load instruction LWI is a load-use instruction. In some embodiments, the instruction detector 124 can determine if using the execution result of the load instruction LWI to execute an instruction would cause a load-use data hazard, thereby detecting if the load instruction LWI is a load-use instruction. The instruction is executed after the load instruction LWI.

In step 804, the load instruction is decoded to generate a decoding result. For example, the instruction decode unit 122 can decode the load instruction LWI to generate the decoding result DR.

In step 806, an address requested by the load instruction is generated according to the decoding result. For example, the address generator 136 can generate the address addr requested by the load instruction LWI according to the decoding result DR.

In step 808, when it is detected that the load instruction is in the load-use scenario, the address is stored into a data buffer. For example, when the instruction detector 124 detects that the load instruction LWI is the load-use instruction, the data buffer 138 can store the address addr.

In step 810, data requested by the load instruction is stored into the data buffer according to the address. For example, the data buffer 138 can store the data requested by the load instruction LWI according to address addr.

As those skilled in the art can appreciate each operation of the data processing method 800 after reading the above paragraphs directed to FIG. 1 to FIG. 7, further description is omitted here for brevity.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A processor circuit, comprising:
an instruction decode unit, configured to decode a load instruction to generate a decoding result;
an instruction detector, coupled to the instruction decode unit, the instruction detector being configured to generate an indication signal by detecting if the load instruction is in a load-use scenario;
an address generator, coupled to the instruction decode unit, the address generator being configured to generate a first address requested by the load instruction according to the decoding result; and
a data buffer, coupled to the instruction detector and the address generator, the data buffer being configured to selectively store the first address generated from the address generator according to the indication signal, wherein when the indication signal indicates that the load instruction in the load-use scenario, the data buffer is configured to store the first address generated from the address generator, and store data requested by the load instruction according to the first address.

2. The processor circuit of claim 1, wherein the processor circuit has pipeline architecture; each of the instruction decode unit and the instruction detector is located in an instruction decode stage of the pipeline architecture, and each of the address generator and the data buffer is located in an execution stage of the pipeline architecture.

3. The processor circuit of claim 1, wherein the instruction detector is configured to receive the load instruction and an instruction executed after the load instruction, and determine if using an execution result of the load instruction to execute the instruction would cause a load-use data hazard; when it is determined that using the execution result of the load instruction to execute the instruction would cause the load-use data hazard, the instruction detector detects that the load instruction is in the load-use scenario.

4. The processor circuit of claim 1, wherein the data buffer is further configured to provide data requested by the load instruction for the instruction decode unit.

5. The processor circuit of claim 1, further comprising:
a cache memory, coupled to the data buffer, wherein the data buffer is configured to send a read request to the cache memory to read data pointed to by the first address in the cache memory; the data read by the data buffer serves as the data requested by the load instruction.

6. The processor circuit of claim 1, further comprising:
a bus interface unit, coupled between the data buffer and an external memory, wherein the data buffer is configured to send a read request to the external memory through the bus interface unit, so as to read data pointed to by the first address in the external memory; the data read by the data buffer serves as the data requested by the load instruction.

7. The processor circuit of claim 1, wherein when the processor circuit is configured to process a memory access instruction, the instruction decode unit is configured to decode the memory access instruction to generate another decoding result, the address generator is configured to generate a second address requested by the memory access instruction according to the another decoding result, and the data buffer is configured to check if the second address has been stored in the data buffer; when the second address has been stored in the data buffer, the data buffer is configured to update data pointed to by the second address in the data buffer with data requested by the memory access instruction.

8. The processor circuit of claim 7, wherein the memory access instruction is another load instruction or a store instruction.

9. The processor circuit of claim 1, wherein the data buffer includes:
a storage space, comprising a plurality of entries, wherein the first address and the data requested by the load instruction are stored in an entry included in the entries; and
a control circuit, coupled to the storage space, wherein after the first address is stored in the entry and before the data requested by the load instruction is stored in the entry, the control circuit is configured to set a lock bit field of the entry to a bit pattern to protect information stored in the entry from being modified by at least one other instruction different from the load instruction.

10. The processor circuit of claim 9, wherein when each of the first address and the data requested by the load instruction is stored in the entry, the control circuit is configured to set the lock bit field to another bit pattern to allow the information stored in the entry to be modified.

11. A data processing method, comprising:
receiving a load instruction, and generating an indication signal by detecting if the load instruction is in a load-use scenario;
decoding the load instruction to generate a decoding result;
generating a first address requested by the load instruction according to the decoding result;
selectively storing the first address according to the indication signal, wherein when the indication signal indicates that the load instruction is in the load-use scenario, storing the first address into a data buffer; and
when the indication signal indicates that the load instruction is in the load-use scenario, storing data requested by the load instruction into the data buffer according to the first address.

12. The data processing method of claim 11, further comprising:
providing pipeline architecture, the pipeline architecture comprising an instruction decode stage and an execution stage;
wherein each of the step of detecting if the load instruction is in the load-use scenario and the step of decoding the load instruction to generate the decoding result is executed in the instruction decode stage; each of the step of generating the first address according to the decoding result and the step of storing the first address into the data buffer is executed in the execution stage.

13. The data processing method of claim 12, further comprising:
returning the data requested by the load instruction from the data buffer to the instruction decode stage.

14. The data processing method of claim 11, wherein the step of detecting if the load instruction is in the load-use scenario comprises:
determining if using an execution result of the load instruction to execute an instruction would cause a load-use data hazard, wherein the instruction is executed after the load instruction; and when it is determined that using the execution result of the load instruction to execute the instruction would cause the load-use data hazard, detecting the load instruction is in the load-use scenario.

15. The data processing method of claim 11, wherein the step of storing the data requested by the load instruction into the data buffer according to the first address comprises:
   sending a read request to a cache memory;
   reading data pointed to by the first address in the cache memory according to the read request; and
   storing the data pointed to by the first address in the cache memory into the data buffer, the data stored in the data buffer serving as the data requested by the load instruction.

16. The data processing method of claim 11, wherein the step of storing the data requested by the load instruction into the data buffer according to the first address comprises:
   sending a read request to an external memory through a bus interface unit;
   reading data pointed to by the first address in the external memory according to the read request; and
   storing the data pointed to by the first address in the external memory into the data buffer through the bus interface unit, the data stored in the data buffer serving as the data requested by the load instruction.

17. The data processing method of claim 11, further comprising:
   receiving a memory access instruction, and decoding the memory access instruction to generate another decoding result;
   generating a second address requested by the memory access instruction according to the another decoding result;
   checking if the second address has been stored in the data buffer; and
   when the second address has been stored in the data buffer, updating data pointed to by the second address in the data buffer with data requested by the memory access instruction.

18. The data processing method of claim 17, wherein the memory access instruction is another load instruction or a store instruction.

19. The data processing method of claim 11, wherein each of the first address and the data requested by the load instruction is stored in an entry of the data buffer; and the step of storing the data requested by the load instruction into the data buffer according to the first address comprises:
   after the first address is stored in the entry and before the data requested by the load instruction is stored in the entry, protecting information stored in the entry from being modified by at least one other instruction different from the load instruction.

20. The data processing method of claim 19, wherein the step of storing the data requested by the load instruction into the data buffer according to the first address further comprises:
   when each of the first address and the data requested by the load instruction is stored in the entry, allowing the information stored in the entry to be modified.

* * * * *